United States Patent [19]

Anderson et al.

[11] Patent Number: 4,675,655

[45] Date of Patent: Jun. 23, 1987

[54] APPARATUS AND METHOD FOR MARKER VERIFICATION

[75] Inventors: Philip M. Anderson, Chatham; Richard C. Ujazdowski, Flemington; Jeffrey C. Urbanski, Sparta, all of N.J.

[73] Assignee: Allied Corporation, Morris Township, Morris County, N.J.

[21] Appl. No.: 700,256

[22] Filed: Feb. 11, 1985

[51] Int. Cl.⁴ .................. G08B 26/00; G06K 5/00
[52] U.S. Cl. .................. 340/505; 340/551; 340/825.34; 235/380
[58] Field of Search .......... 340/551, 505, 825.34, 340/825.54, 501, 314, 572; 235/380, 493–495; 356/71; 283/82

[56] References Cited

U.S. PATENT DOCUMENTS 3,790,945  2/1974  Fearon ............................... 340/572
3,836,842  9/1974  Zimmermann et al. ........ 340/572 X
4,510,489  4/1985  Anderson, III et al. ........... 340/572
4,510,490  4/1985  Anderson, III et al. ........... 340/572

*Primary Examiner*—Glen R. Swann, III
*Assistant Examiner*—Thomas J. Mullen, Jr.
*Attorney, Agent, or Firm*—Ernest D. Buff; Gerhard H. Fuchs

[57] ABSTRACT

A unit and method are provided for the short range scanning of magnetic markers. The scanning unit includes an antenna adapted to provide a narrow interrogation field of short overall range. Control circuitry is provided for establishing the applied magnetic interrogation field and detecting and processing the response signal of the marker. A light emitting diode then provides a signal to the operator indicating whether a response signal is received from the marker being interrogated. The scanning unit is also equipped with a ferromagnetic plate of high magnetic coercivity for producing a dc bias field and activating the marker.

15 Claims, 4 Drawing Figures

APPARATUS AND METHOD FOR MARKER VERIFICATION

TECHNICAL FIELD

This invention relates generally to scanning units for interrogating and reading markers. More particularly, the invention provides a compact, portable scanning unit for short-range operations capable of energizing, reading and verifying a correctly oriented, closely-coupled marker.

BACKGROUND OF THE INVENTION

A recent study by the U.S. International Trade Commission indicates that counterfeiting of name brand goods is presently costing American businesses up to eight billion dollars in lost sales annually. In addition, the counterfeiting is effectively costing the work force some 131,000 jobs per year. Still more startling is the fact that the counterfeiting menace is increasing. The growth of counterfeiting, however, should be easy to understand when the huge profits obtainable by the counterfeiter on the sale of low quality, bogus goods at name brand prices are considered.

In order to combat the counterfeiting problem, technologies have been developed for placing an identifiable marker or tag on the name brand goods. Of course, the markers themselves must be made very difficult to counterfeit in order to be effective. Typically, the marking system is designed so that at least the cost of breaking the code and reproducing the marker or tag is prohibitive to the counterfeiter. However, on the other hand, the markers and the identifying system must be produced at a relatively low cost so as to make the concept economically feasible to the brand name manufacturer seeking to protect its products.

An example of a tagging or marking system is found in copending U.S. patent application Ser. No. 373,061 filed Apr. 29, 1982 now U.S. Pat. No. 4,510,489, entitled "Surveillance System Having Magnetomechanical Marker" and assigned to Allied Corporation, the assignee of the present invention. The marker preferably includes an amorphous metal strip of ferromagnetic material adapted to be magnetically biased and thereby armed to resonate mechanically at a frequency within the frequency band of a magnetic interrogation field.

As shown in the copending application, markers of this kind are presently used in theft detection systems. A transmitting apparatus including a drive coil is situated on one side of a passageway leading to an exit from the premises. A receiving apparatus including a receive coil is positioned at the opposite side of the passageway. The drive coil sweeps through a predefined spectrum of frequencies including the resonant frequency of the target ribbon of the marker.

As the drive frequency passes through the resonant frequency of the marker ribbon, the marker generates a distinctive increase in the voltage induced in the receive coil. This marked effect upon the fundamental frequency voltage induced in the receive coil allows simple and accurate marker detection even in the presence of other objects. Of course, detection indicates that the marker has not been properly deactivated or removed from the marked article by the cashier.

In such a theft detection system, the drive and receive coils of the antenna are spaced apart the width of the passageway, possibly as much as six feet (6'). Thus, the interrogation zone defined between the drive and receive coils is quite large. The drive coil must, therefore, be adapted to apply a wide, strong magnetic interrogation field in order to energize and detect targets in the passageway leading to the exit. This system is not, however, well adapted for checking articles at close range for authenticity or the like.

Thus, a need is identified for a scanning unit capable of energizing and reading markers only at a very short range and within a very narrow zone. A hand held battery powered unit with this capability is desired for on site product verification at any distribution or retail location.

Further, if target markers of this type are to be successfully adapted for product verification, it is desirable to have a larger number of different marker codes available to prevent or discourage counterfeiting of the markers. One way we have discovered to do this is mentioned in copending U.S. patent application Ser. No. 384,814, filed June 3, 1982 now U.S. Pat. No. 4,510,490, for coded surveillance system having magnetic mechanical marker. This includes the use of markers including multiple amorphous ribbons; each ribbon being designed to resonate mechanically in response to the interrogation field at a different identifiable frequency. However, where a wide range drive coil is used to interrogate the markers as in the prior art, only the presence of the different frequency ribbons (in no particular sequence) may be determined. We have found there is no previously-known way to accurately determine the order or sequence of the ribbons in the marker.

A short range, narrow zone scanning unit has been developed to solve the problem. With the scanning unit contemplated by us, the number of marker codes can be greatly increased as the multiple ribbons may be lined up side-by-side and read in sequence. Where original manufactured articles are properly marked, any variation in the one or more frequencies present, or in the order of the frequencies, indicates that the marked article is a counterfeit.

Of course, such a scanning unit also has ready application to other security devices wherein an increased number of codes is desirable, such as in card reading devices, remote control locks, article surveillance devices, and personal identification systems.

SUMMARY OF THE INVENTION

The present invention provides an apparatus and method for the short range scanning in a narrow zone of a properly oriented marker. The marker is capable of producing a response signal of high amplitude and identifying characteristics in the presence of an applied magnetic interrogation field.

Briefly stated, the scanning unit of the present invention includes antenna and circuit means for establishing a narrow ac magnetic field of varying frequency and short overall range. This interrogation field is used in energizing a closely coupled, properly oriented marker that is attached to an article to be identified. The marker comprises one or more ribbons of magnetostrictive ferromagnetic material. The ribbon is preferably an amorphous metal and adapted to be magnetically biased in a dc field, and thereby, armed to resonate mechanically at a known, standard frequency within the frequency band of the incident interrogation field. A ferromagnetic element of high magnetic coercivity provided in the marker or a similar plate provided in the scanning unit serves to establish the bias field.

Upon exposure to the dc bias field the marker is characterized by a substantial change in its effective magnetic permeability as the applied ac field sweeps through at least one of the resonant and anti-resonant frequencies that provide the marker with signal identity. Means in the scanning unit are provided for detecting the resulting change in coupling between the drive coil and receive coil of the antenna. A comparator is provided in the scanning unit for comparing the actual response signal frequency of the interrogated marker to the standard response signal frequency of the marker known to have been attached to the article to be identified. Means for indicating whether or not the standard response signal is received serves to verify the identity or authenticity of the article to the operator.

Preferably, the scanning unit is hand held and battery powered. Thus, the unit may be utilized for the on-site interrogation and detection of markers. This is a particularly important feature where the marked articles are name brand goods to be protected from counterfeiting. Advantageously, the portable scanning unit provides a field agent with the ability to verify the marker code and, therefore, the originality of the goods at any distribution or retail location.

The field agent verifies the goods simply by aligning the scanning unit directly adjacent to the marker with the marker properly oriented with respect to the unit antenna. Where the marker does not include its own biasing, the step of activating the marker is accomplished by exposing the closely coupled marker to a dc bias field generated in the scanning unit. The scanning unit is then triggered for establishing a short-range, narrow magnetic interrogation field that is applied to the marker. The authenticity of the marker and, therefore, goods verification is completed by detecting a change in the induced voltage occurring at the mechanical resonance response frequency of the marker and comparing the actual response signal of the interrogated marker to the encoded frequency printed on the marker attached to the original goods. A match indicates that the goods are original. Conversely, any difference, between the actual response frequency and the encoded frequency printed on the marker indicates that the goods are counterfeit.

Advantageously, it should be recognized that the short range, narrow zone scanning unit and method of the present invention allow multiple magnetostrictive ferromagnetic strips to be positioned side-by-side in a single marker and detected sequentially. Thus, a marker is not only identifiable by the response signal frequencies present but also by the order of those frequencies in the marker. As a consequence, a greater number of marker codes is available. This serves to greatly reduce the feasibility of counterfeiting the markers.

BRIEF DESCRIPTION OF THE DRAWINGS

The invention will be more fully understood and further advantages will become apparent when reference is made to the following detailed description of the preferred embodiment of the invention and the accompanying drawings in which.

DESCRIPTION OF THE PREFERRED EMBODIMENTS

Figure 1:
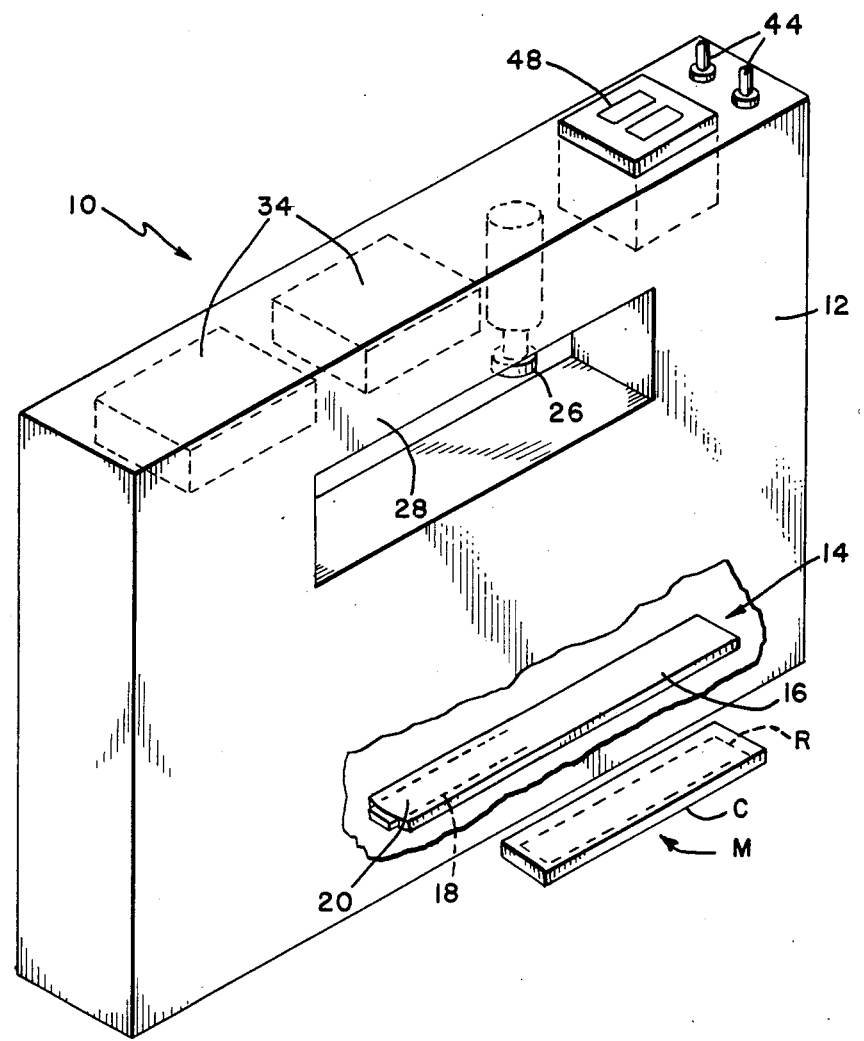
FIG. 1 is a perspective view of the scanning unit of the present invention shown positioned over a magnetomechanical marker.

Reference is now made to FIG. 1 showing the scanning unit 10 of the present invention. For purposes of illustration, the scanning unit 10 is being described in connection with a scheme for verifying or authenticating marked articles or other goods. It should be recognized, however, that the unit 10 could be used for other purposes such as spot-checking mobile article surveillance, in personnel identification security systems or the like.

The scanning unit 10 is utilized in energizing and detecting a correctly oriented closely coupled marker M attached to the original articles or goods that are the subject of protection. The marker M may include one or more ribbons R of magnetostrictive material. Each ribbon R is preferably a strip of amorphous metal adapted to be magnetically biased and thereby, armed to resonate mechanically at a standard or known frequency. The ribbon or ribbons R are positioned in a container C. The container C is constructed so that each ribbon R remains unrestrained and undamped in order to be free to vibrate.

As shown in FIG. 1, the scanning unit 10 includes a housing 12 containing an antenna along the bottom, generally designed by reference numeral 14. The antenna 14 is adapted to operate only over a relatively narrow zone and at a short overall range. An example of such an antenna is found in copending U.S. patent application Ser. No. 700,257 of J. C. Urbanski, filed of even date herewith, entitled Dual Antenna For Magnetic Markers and incorporated herein by reference.

The antenna 14 includes a substantially flat drive coil 16 and an overlapping receive coil 18 having at least one loop. The individual windings or loops of the drive coil 16 and receive coil 18 are contained in planes substantially perpendicular to each other. Advantageously, transformer action is therefore small and electromagnetic noise is minimized.

When the drive coil 16 is energized to produce an interrogation frequency of electromagnetic radiation, most of the resulting magnetic field lines are concentrated inside the drive coil. A relatively weak magnetic field, however, is generated adjacent and along the outside of the drive coil 16. This weak field is capable of exciting a properly oriented and closely coupled marker M at very short range (note position of marker relative to scanning antenna in FIG. 1).

Preferably, the scanning unit 10 is also provided with biasing means, such as a ferromagnetic plate 20. The plate 20 has a high magnetic coercivity and provides a dc bias field for activating the marker M. As shown, the ferromagnetic plate 20 may be a template upon which the drive and receive coils 16, 18, respectively are wound. Particularly, the template 20 may be composed of a non-metallic magnetic material, such as barium ferrite in a plastic binder.

Advantageously, the activating of the marker M through the establishment of a bias field originating from the scanning unit 10 eliminates the need for the inclusion of a biasing ferromagnetic element in each individual marker M. Thus, the cost of manufacturing the individual markers M is greatly reduced.

When the dc bias field and ac interrogation field are applied to the magnetostrictive ribbon R of the marker M, energy is alternately stored and released with the frequency of the ac field. Magnetostrictive energy storage and release are maximal at the mechanical resonance frequency and minimal at the anti-resonance frequencies of the material. The energy storage and release induces a voltage in the receive coil 18 of the antenna 14 via flux density changes in the ribbon R. The flux density change relates to an increase in the effective magnetic permeability of the ribbon R at the resonance frequency and a decrease at anti-resonance. This results in a directly proportional change in the magnetic coupling between the drive coil 16 and receive coil 18.

Figure 2:
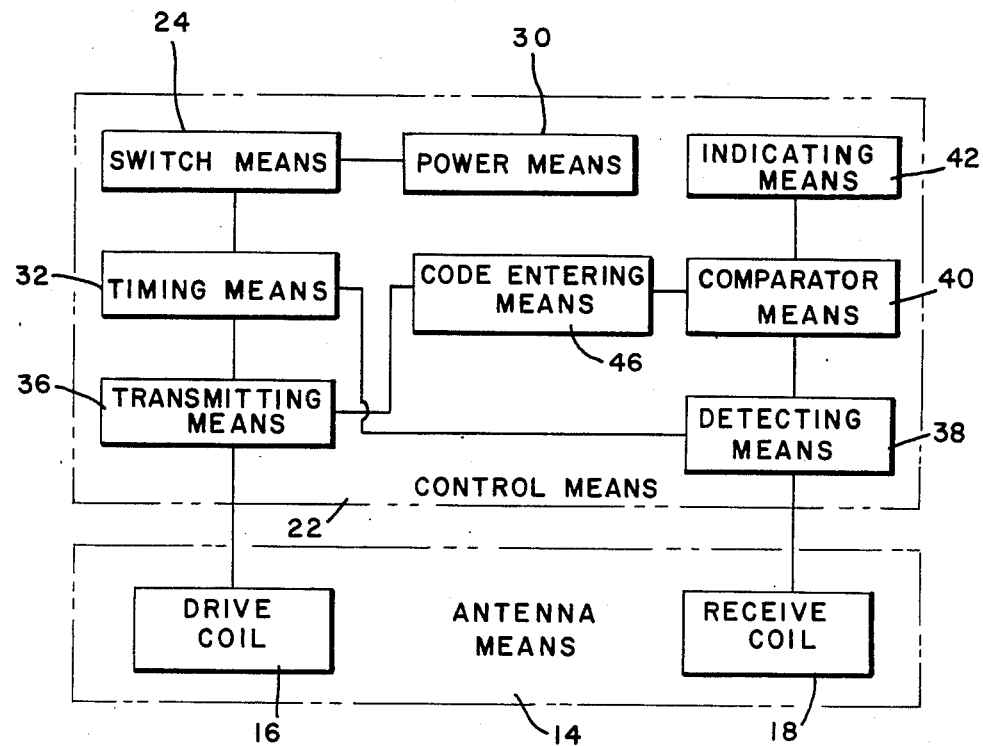
FIG. 2 is a schematic circuit diagram of the scanning unit of the present invention.

The scanning unit 10 is equipped with a control means or circuit 22, schematically shown in FIG. 2, for establishing the applied interrogation field and detecting and processing the marker response signal. The control circuit 22 is triggered by a switch 24, such as a button 26 on the handle 28 of scanning unit 10 (note FIGS. 1 and 2 in combination). The switch 24 connects the power means 30 to the timing means 32. Preferably, the power means 30 comprises a pair of dry cell batteries 34 contained in the scanning unit housing 12 (see FIG. 1). Advantageously, this eliminates the need for external connection of the scanning unit 10 to an electrical power source, thereby allowing use of the unit anywhere.

The timing means 32 synchronizes the operation of transmitting means 36 and detecting means 38. The timing means 32 sends a gate pulse to the transmitting means 36 that activates a swept frequency oscillator and amplifier (not shown). Upon being activated, the swept frequency oscillator, adjusted with its center frequency approximately equal to that of the markers M employed to tag the articles, drives the amplifier. The amplifier then sends a signal to the drive coil 16 for the duration of the gate pulse, such that an ac interrogation field is developed and applied to the closely coupled marker M. The marker M is then excited and undergoes mechanical oscillation at its resonance frequency; the vibrations serving to induce a voltage in the receive coil 18.

Upon completion of the interrogating signal, the timing means 32 produces a gate pulse to the detecting means 38. The gate pulse activates the detecting means 38. Only after activation, the output of the receive coil 18 is applied to the detecting means 38. Also, a narrow band pass filter (not shown) can be utilized in the detecting means 38 having a center frequency following the drive signal. This system thus provides immunity to false signals, such as stray radiated or power line conducted sources. A false signal is highly unlikely with the circuit of the present invention, since such interference would have to occur only at the resonant frequency and, in addition be synchronized with the swept frequency of the drive signal. The detecting means 38 also includes an integrator (not shown) to integrate (average) the signal so as to further inhibit false signals being generated from synchronous or wideband interference.

The signal thus processed in the detecting means 38 is applied to the input of comparator 40. If the frequency detected is equal to the standard frequency of the markers used to mark the articles, a signal is sent to the indicating means 42. The appropriate one of the light emitting diodes 44 is activated to display an affirmative signal indicating the authenticity of the article. If the standard frequency and the detected signal do not match or if there is no detected signal, a signal is sent causing the indicating means 42 to display a negative signal by activation of the other diode 44. This of course indicates to the operator that the goods are counterfeit.

The scanning unit 10 may also be provided with a code entering means 46, including a key pad 48 or the like. The code entering means provides the operator with the ability to enter different marker codes into the scanning unit 10. For example, if the original articles are marked with a marker M having a resonance frequency of 33 kilohertz, a code representing this frequency is entered into the scanning unit via the key pad 48. This provides a signal to the transmitting means 36 for an appropriate center frequency, and a signal to the comparator means 40 to compare the detected response signal with the thus established standard marker frequency (i.e. 33 kilohertz).

Figure 3:
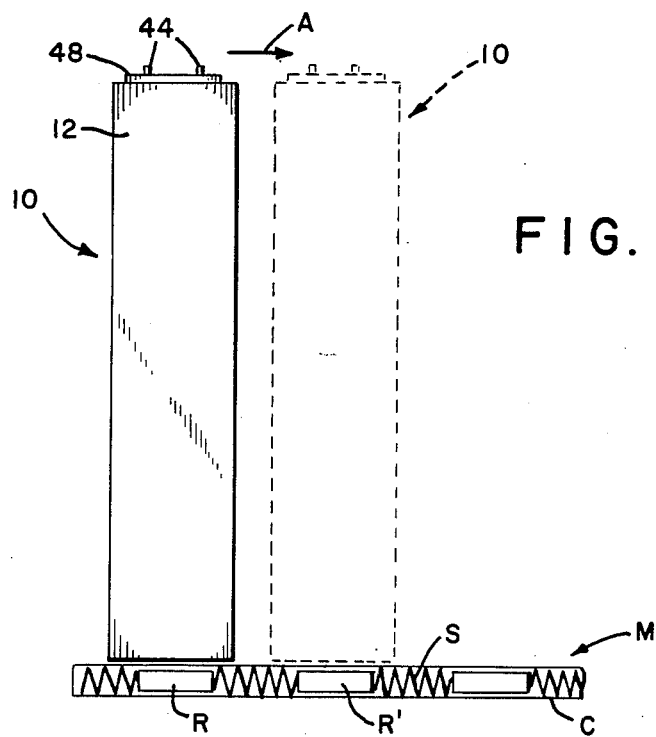
FIG. 3 is a side elevational view of the scanning unit of the present invention demonstrating the method of sequentially reading side-by-side ribbons in a multi-ribbon/multi-frequency marker.

Advantageously, this allows a single scanning unit 10 to be programmed and utilized in detecting different frequency ribbons and even multiple ribbons contained in a single marker. This is done by simply placing the unit over each individual ribbon R of the marker M one at a time, triggering the unit, comparing the actual response signal to the standard response signal and observing the LED display (note FIG. 3). Where the multiple ribbons R are used, the ribbons may be stacked on top of each other or appropriate spacers S, such as accordian folded, stiff-paper or plastic sheets, may be provided with the marker M.

Figure 4:
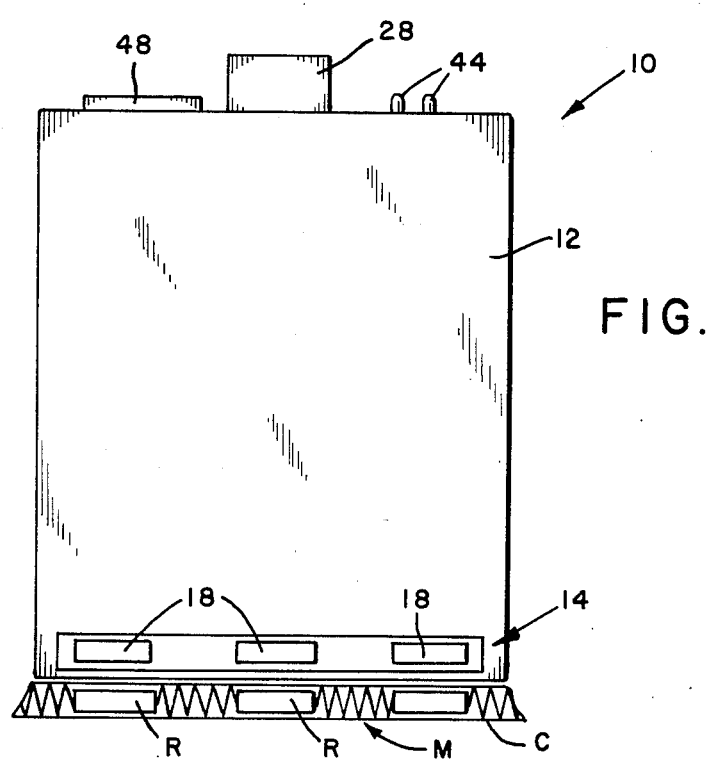
FIG. 4 is a schematic side-elevational representation of an alternative embodiment of the scanning unit of the present invention including a specially adapted antenna array for reading multiple side-by-side ribbons with a single scan.

An alternative embodiment of the scanning unit 10 of the present invention is schematically shown in FIG. 4. This embodiment allows for the sequential reading of multi-ribbon/multi-frequency markers M without moving the unit 10. A composite antenna 14 is provided having a series of receive coils 18 positioned side-by-side along the bottom of the unit. The receive coils 18 are spaced so as to match the spacing of the side-by-side ribbons R in the marker M. The marker code is entered into the unit 10 via the key pad 48, as described above. The unit 10 is then positioned adjacent the marker M with each receive coil 18 overlying one of the marker ribbons R. The unit is then triggered over the properly oriented marker M with the response signals received by each receive coil 18 being simultaneously processed and compared to the standard signal code of the ribbons in that particular marker used to tag the original goods.

In operation, the first step involves entering into the scanning unit 10 the resonance frequency code of the marker M used to mark the original goods. The scanning unit 10 is then aligned directly adjacent and over the marker ribbon R, as shown in FIG. 1. The aligning of the unit in this way serves to place the marker in position for excitation with an ac interrogation field while also establishing a dc bias field between the closely coupled marker and ferromagnetic plate 20.

Once triggered, the unit 10 operates by establishing a short range and narrow magnetic interrogation field for application to the correctly oriented and closely coupled marker M. The unit 10 is then involved in: (1) detecting a response signal or change in the induced voltage occuring at the mechanical resonance response frequency of the marker M, and (2) comparing the actual response signal of the interrogated marker to the standard response signal of the marker used to mark the original goods. The unit 10 then completes the operation cycle by indicating either that the signals are identical and, therefore, the goods are authentic or that the signals are different and, therefore, that the goods are counterfeits.

When the scanning unit 10 is being used to read multi-ribbon/multi-frequency marker M (see FIG. 3), operation is essentially the same. Operation is initiated by entering the resonance frequencies of the multiple ribbons contained in the marker M as, for example, sequentially reading from left to right. Next, alignment of the scanning unit 10 directly over the first ribbon R at the lefthand side of the marker is effected. The unit 10 is then triggered for reading the first ribbon R. Following the reading of the first ribbon R, operation is continued by repositioning the scanning unit 10 over the second ribbon R' (note action arrow A and unit 10 shown in dashed outline in FIG. 3). These steps are then repeated as often as needed to read all the ribbons of the multi-ribbon marker M.

Following the reading of all the ribbons, the unit 10 completes its cycle of operation by indicating whether the response signals of the marker M being interrogated are at the proper frequency and in the proper order so as to correspond with the marker used to tag the original articles. If the frequencies and orders match, a positive signal is indicated and the authenticity of the goods is verified. If, however, there is any discrepancy between the frequencies present or the order of the frequencies, a negative signal is indicated to show that the goods are counterfeit.

Operation of the scanning unit embodiment shown in FIG. 4 further simplifies the reading of multi-ribbon markers. Specifically, once again the initial operating step involves the entering of the standard frequency codes into the scanning unit 10. The unit 10 is then positioned over the marker M as shown in FIG. 4 with each receive loop of the antenna overlying a marker ribbon. Once triggered, the unit 10 begins simultaneously detecting and comparing the multiple frequencies of the marker being interrogated with the standard frequencies of the markers used to tag the original article. Again, the final step of the operating cycle involves the indicating of the authenticity of the article to which the marker M is attached.

In summary, numerous benefits result from employing the concepts of the present invention. The scanning unit 10 of the present invention is small, lightweight and, therefore, easily portable. The scanning unit 10 is also advantageously capable of distinguishing multi-ribbon/multi-frequency markers not only by the frequencies of the signals produced in response to the applied magnetic interrogation field, but also by the sequence or order of the frequencies appearing in the marker.

The foregoing description of a preferred embodiment has been presented for purposes of illustration and description. It is not intended to be exhaustive or to limit the invention to the precise form disclosed. Obvious modifications or variations are possible in light of the above teachings. The embodiment was chosen and described simply to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A short range scanning unit capable of (1) energizing a correctly oriented, closely coupled magnetomechanical marker that provides an identifiable signal in response to an applied magnetic interrogation field, and (2) detecting the response signal, comprising:
   antenna means including a drive and receive coil providing a narrow interrogation zone and short interrogation range;
   control means adapted to be manually triggered upon alignment of said scanning unit directly adjacent the marker to establish the applied magnetic interrogation field and to detect and process the response signal from the marker; and
   indicator means for indicating if a response signal is received from the marker being interrogated.

2. The scanning unit recited in claim 1, including a biasing means providing a dc magnetic bias field to activate the marker to produce an identifiable signal in response to an applied interrogation field.

3. The scanning unit recited in claim 2, wherein said biasing means is a ferromagnetic plate of high magnetic coercivity adjacent said antenna means.

4. The scanning unit recited in claim 1, wherein said antenna means includes a winding template of nonmetallic magnetic material of high magnetic coercivity providing a dc magnetic bias field for activating the marker to produce an identifiable signal, said drive and receive coil being wound around said template.

5. The scanning unit recited in claim 1, wherein said control means includes means for detecting a change in the induced voltage occurring at the mechanical resonance response frequency of the marker.

6. The scanning unit recited in claim 1, wherein said control means includes means for entering an interrogation code into the unit.

7. The scanning unit recited in claim 1, wherein said control means includes comparator means for comparing the actual target response signal of the marker being interrogated to a standard signal.

8. The scanning unit recited in claim 1, wherein said control means includes timing means for controlling the duration of establishing the interrogation field, the duration of detecting the response signal, and the time interval therebetween.

9. The scanning unit recited in claim 1, wherein said scanning unit is portable thereby allowing on-site marker interrogation and detection.

10. A method utilizing a scanning unit for (1) energizing a correctly oriented, closely coupled magnetomechanical marker that provides an identifiable signal in response to an applied magnetic interrogation field, and (2) detecting the response signal of the marker at short range, and comprising the steps of;
   establishing a short range and narrow magnetic interrogation field for application to the closely coupled marker;
   aligning the scanning unit directly adjacent the marker prior to triggering the unit to interrogate the marker;
   detecting a change in the induced voltage occurring at the mechanical resonance response frequency of the marker;
   comparing the actual response signal of the interrogated marker to a standard signal;

indicating if the standard response signal is received from the marker being interrogated.

11. The method recited in claim 10 wherein said marker comprises multiple ribbons having resonance frequencies and said method includes the additional step of repositioning the scanning unit over the marker so as to allow the reading of the resonance frequencies of said multiple ribbons in sequence.

12. The method recited in claim 10, or 11 including the additional step of activating the marker to produce an identifiable signal by exposing the marker to a dc bias field generated in the scanning unit.

13. The method recited in claim 10, or 11 including the additional step of entering an interrogation code into the scanning unit prior to triggering the unit to interrogate the marker.

14. The method recited in claim 10, or 11 including the additional step of controlling the duration of establishing the interrogation field, the duration of detecting the response signal, and the time interval therebetween.

15. The method recited in claim 10, including the additional step of simultaneously reading resonance frequencies of ribbon markers.

* * * * *